Figure 1:
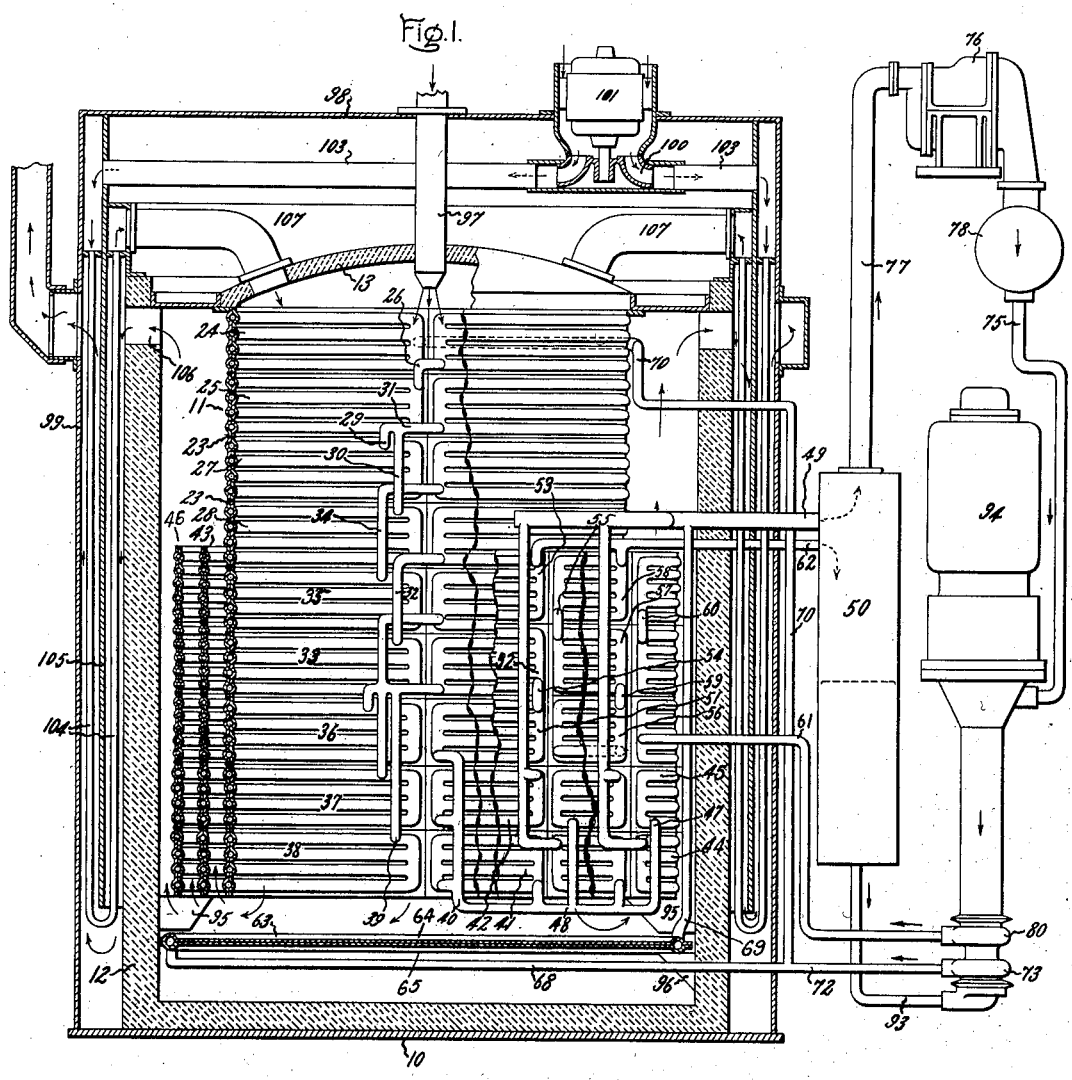

Aug. 13, 1935.   L. A. SHELDON   2,011,423
ELASTIC FLUID GENERATOR
Filed April 5, 1933   2 Sheets-Sheet 1

Inventor:
Lucian A. Sheldon,
by Charles V. Miller
His Attorney.

Aug. 13, 1935.    L. A. SHELDON    2,011,423
ELASTIC FLUID GENERATOR
Filed April 5, 1933    2 Sheets-Sheet 2
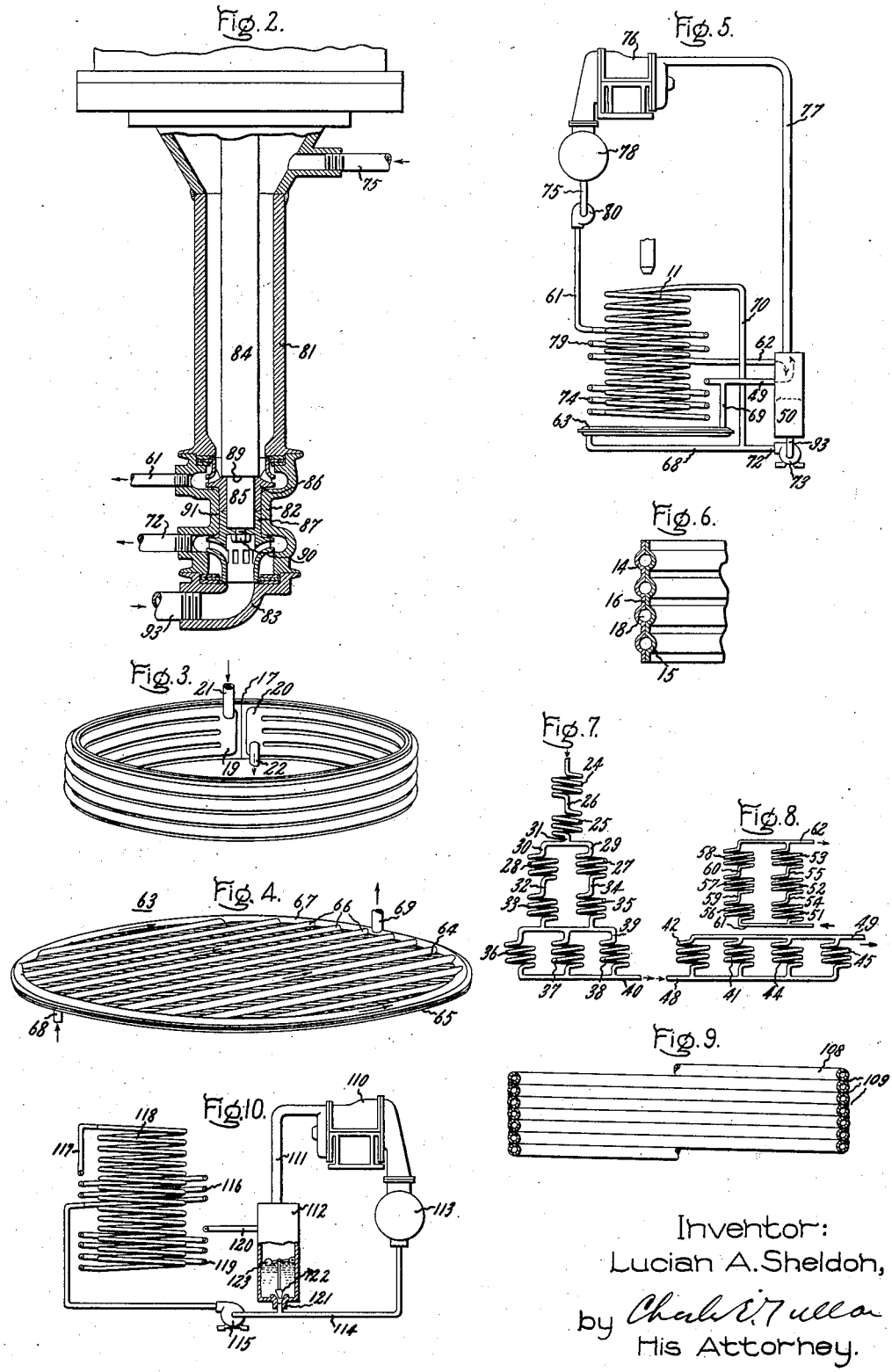
Inventor:
Lucian A. Sheldon,
by Charles W. Mullan
His Attorney.

Patented Aug. 13, 1935

2,011,423

UNITED STATES PATENT OFFICE 2,011,423

ELASTIC FLUID GENERATOR

Lucian A. Sheldon, Schenectady, N. Y., assignor to General Electric Company, a corporation of New York Application April 5, 1933, Serial No. 664,537

2 Claims. (Cl. 122—250)

The present invention relates to elastic fluid power plants in which elastic fluid is produced in an elastic fluid generator and its available heat energy consumed in a prime mover whence it is returned through a condenser to the elastic fluid generator. More specifically, the invention relates to the kind of power plants in which mercury liquid is used as an operating fluid although it is not necessarily limited thereto.

The object of the present invention is to provide an improved construction and arrangement for an elastic fluid power plant whereby a comparatively small amount of liquid is needed for operating the plant.

For a consideration of what I believe to be novel and my invention, attention is directed to the following description and the claims appended thereto, in connection with the accompanying drawings.

In the drawings, Fig. 1 represents an elastic fluid power plant embodying my invention; Figs. 2, 3, and 4 are detailed views of certain parts of Fig. 1; Fig. 5 is a diagrammatic illustration of Fig. 1; Fig. 6 is a sectional view of Fig. 3; Figs. 7 and 8 are connection diagrams of certain parts of Fig. 1; Fig. 9 shows a modification of the part shown in Fig. 3; and Fig. 10 represents a modified form of a power plant in accordance with my invention.

In accordance with my invention I provide an elastic fluid generator which comprises a nest of tubes having a surface defining a combustion space and exposed to radiant heat, and a conduction surface which together with a furnace wall or another nest of heating tubes defines a conduction or gas chamber communicating with the combustion chamber. The combustible material is burned within the combustion chamber and the fire gases are conducted from the combustion chamber through the gas chamber. The nest of tubes comprises a plurality of heating elements which are preferably located above each other and connected in series or series parallel to define channels extending substantially in horizontal planes and containing liquid to be heated and evaporated. The preferred form of such a nest of tubes is that of a cylinder with a circular, elliptical, or any desirable cross section.

In Fig. 1, I have shown an elastic fluid power plant which comprises a furnace 10 and a nest of tubes 11. The furnace has a brick wall 12 and an arch or ceiling 13 which in the present instance serves to support or carry the nest of tubes 11. The nest of tubes comprises a plurality of heating elements connected in series parallel. A perspective view of one of the elements is shown in Fig. 3 and their connections to each other is shown in Fig. 7. Each element (Fig. 3 and Fig. 6) has an outer wall 14 and an inner wall 15 of corrugated sheet metal. The two sheets are placed together with the corrugations opposite each other and the engaging portions 16 between the corrugations are sealed by soldering or stitch-welding. The ends 17 of the cylindrically-shaped body are completely united such as by welding. The channels 18 defined by the corrugations terminate ahead of the united ends 17 and communicate with each other through the portions 19 and 20 respectively of the body. The portion 19 is provided with an inlet conduit 21 and the portion 20 with a discharge conduit 22. Thus each of these elements represents a body with a plurality of parallel channels or paths for fluid connected to a common inlet conduit 21 and a common discharge conduit 22 respectively. A plurality of heating elements are placed above each other and their engaging edges are sealed or united by welds 23 (Fig. 1).

Referring to Fig. 7, which is a connection diagram of the elements forming the inner nest of tubes 11, the uppermost heating element 24 is connected to a second heating element 25 by means of a conduit 26. The succeeding two elements 27 and 28 have inlet conduits 29 and 30 respectively connected in parallel to the discharge conduit 31 of the element 25. The discharge conduit 32 of element 28 is connected to the inlet conduit of element 33 and the discharge conduit 34 of element 27 is connected to the inlet conduit of the element 35. The succeeding three elements 36, 37, and 38 have their inlet conduits 39 and their outlet conduits 40 respectively connected in parallel, the inlet conduits 39 being connected to the outlet conduits of the elements 33 and 35 and the outlet conduits 40 being connected to another nest of heating tubes which will be described hereafter.

During operation, fluid is forced through these heating elements. More specifically, liquid is supplied to the inlet of the first heating element 24 and as the liquid expands and partly vaporizes in the first element or elements it is divided into parallel paths in the succeeding elements. Thus the nest of tubes defines a channel branching into a plurality of channels as regards the direction of flow of fluid, the number of parallel channels or branches increases from the inlet towards the outlet, or from another angle, the nest of tubes defines a channel structure with a total cross sectional area of the path for the fluid increasing from the inlet towards the outlet of the structure.

Concentrically arranged about the inner nest of tubes are two other nests of tubes, of which each comprises a plurality of elements similar to those described above, but of larger diameter. A number of these elements serves for heating and in certain cases super-heating the elastic fluid produced in the inner nest of tubes, and the rest of the elements serve to preheat the liquid to be evaporated.

The two lower elements 41 and 42 of the intermediate nest of tubes 43 (Fig. 1) and the two lower elements 44 and 45 of the outer nest of tubes 46 are connected in parallel, the inlets of the four elements being connected to a conduit 48 and the outlets to a conduit 49. The group of elements thus formed receives fluid from the last group of elements (36, 37, 38) of the inner nest of tubes. To this end the conduit 48 is connected to conduit 40, in substance forms a continuation of the latter, and the conduit 49 for discharging the elastic fluid is connected to a container or drum 50 (Fig. 1) located outside the furnace. The drum 50 acts as a separator for separating the liquid from the elastic fluid. Depending upon the temperature conditions and the circulation of liquid, the group of the four parallel-connected elements may act as a superheater for superheating the fluid received from the inner nest of tubes. In view of this I may term the group of the four parallel-connected elements a superheater, though this term has to be taken in its broader meaning since the superheater does not necessarily superheat the elastic fluid passed through it but merely raises the temperature of the elastic fluid.

The upper three elements 51, 52, and 53 of the intermediate group are connected in series by conduits 54 and 55. The three upper heating elements of the outer nest of tubes 56, 57, and 58 are similarly connected in series by conduits 59 and 60. These elements form two groups which are connected in parallel by conduits or pipes 61 and 62 (Figs. 1 and 8). The group arrangement of the three upper elements of the intermediate and the outer nest of tubes serves as a preheater of liquid to be evaporated. The liquid is supplied to the preheater through the conduit 61 and discharged from the preheater through the conduit 62.

The three combinations of elements above described form in substance a boiler, a superheater, and a preheater, of which the boiler is defined by the inner nest of heating elements, the superheater by the two lower heating elements of both the intermediate and the outer nest of tubes, and the preheater by the three upper elements of both the intermediate and the outer nest of tubes.

Another heating element 63 which may be termed a disk heating element, is provided near the bottom of the furnace. This heating element (Figs. 1 and 4) is made of two corrugated annular plates 64 and 65. Each plate has a plurality of corrugations 66 running parallel to each other and a circumferential corrugation 67. The two corrugated sheets are united with the corrugations opposite each other and the portions intermediate the corrugations, as well as the outer edges of the two sheets, are welded together. The parallel corrugations thus form a plurality of parallel channels which at their ends communicate with each other through a channel defined by the circumferential corrugations. The circumferential channel is connected to an inlet conduit 68 and a diametrically opposed portion of the circumferential channel is connected to an outlet conduit 69. The direction of the flow of fluid passed through this heating element is indicated by arrows (Fig. 4).

Referring now to Fig. 5, where I have shown a diagrammatic illustration of the power plant of Fig. 1, the boiler comprising the inner nest of tubes 11 has an inlet conduit 70 connected to the drum 50 through a conduit 72 including a pumping means 73 with a suction conduit 93. The outlet conduit of the inner nest of tubes 11 is connected to the superheater 74 from which the fluid is discharged through the conduit 49 to the drum 50. The heating element 63 is connected in parallel to the boiler 11 and the superheater 74, that is, its inlet conduit 68 is connected to the conduit 72 and its outlet conduit 69 is connected to the conduit 49. The pump 73 serves to maintain a steady circulation of fluid through the heating elements of the boiler 11, the superheater 74 and the disk heating element 63. The elastic fluid discharged from the conduit 49 into the drum 50 is conducted to a consumer, in the present instance shown as an elastic fluid turbine 76 connected to the drum 50 by means of a conduit 77. The exhaust elastic fluid of the turbine is condensed in a condenser 78 whence it is returned to the drum 50 through the intermediary of the preheater 79, the inlet conduit 61 of the preheater being connected to the condenser 78 by a conduit 75 including a condensate or feed pump 80 for forcing the condensate through the preheater. The outlet conduit 62 of the preheater is connected to the drum.

During operation, a steady circulation of elastic fluid through the boiler, the superheater, and the disk heating element 63 takes place. The fluid heated in these elements is discharged into the drum 50 which acts as a separator of the liquid and the vapor, the liquid drops to the bottom of the drum and is recirculated by means of the circulating pump 73 whereas the vapor is discharged to the consumer. In this arrangement two pumps are used, a condensate or feed pump 80 and a circulating pump 73. Both pumps act against a discharge pressure which is alike in both cases and may be of the order of 500 pounds per square inch. This fact is used in the construction of the pumps.

In accordance with my invention I unite the two pumps in a single structure with their discharge sides adjacent each other, which permits the omission of a special packing on the discharge sides of the pumps. More specifically, the double pump structure in accordance with my invention comprises a cylindrical member 81, (Fig. 2), a pump casing 82 with one end flanged to the cylindrical member 81 and the other end flanged to a member 83. Both pumps have a common shaft 84 with a reduced end portion 85 to which are fastened two impellers 86 and 87. The shoulder 89 defining the reduced shaft portion, and a screw 90, prevent axial movement of the impellers. Each impeller has a hub portion fastened to the shaft and with its outer surface bearing against the inner surface 91 of an intermediate portion of the pump casing. The upper part of the pump casing, together with the impeller 86, forms the feed pump 80 and the lower portion of the pump casing, together with the impeller 87, forms the circulating pump 73. Fluid is conducted to the feed pump through the conduit 75 and discharged from the feed pump through the conduit 61. Fluid is conducted to the circulating pump through the conduit 93 and discharged through the conduit 72. The pump shaft 84 is coupled to and driven by a motor 94 (Fig. 1).

As pointed out above, the various heating elements or heating nests are arranged within a furnace comprising walls 12 and the ceiling 13. The inner cylinder of the heating elements is carried by the ceiling 13 of the furnace, the intermediate and outer cylinders or nests of heating tubes are supported by brackets 95 fastened to the furnace wall. The disk heating element 63 provided at the bottom of the furnace is similarly supported by brackets 96 fastened to the furnace wall 12. Heat is radiated and conducted to the heating elements from a source of heat 97 which may be a burner for pulverized or liquid fuel. The burner projects through the ceiling and is supported by the cover 98 of outer wall or casing 99. The combustion takes place within the inner cylinder of heating elements whereby heat is radiated to the inner or radiation surface of the inner cylinder 11 and the upper surface of the disk heating element 63. The fire gases formed in the combustion space escape from the lower end of the inner cylinder and pass through the spaces defined between the inner cylinder, the intermediate, and the outer cylinder and the furnace wall, the direction of the flow of heating gases being indicated by arrows. The air necessary to maintain combustion is furnished by a blower 100 driven by a motor 101 fastened to the ceiling 98 of the outer casing. The air is conducted from the discharge conduits 103 of the blower to conduits 104 located in the space between the furnace wall 12 and the outer casing wall 99. This space is divided by a partition 105. The furnace gases escaping through openings 106 at the upper portion of the furnace wall are conducted through the space between the furnace wall 12 and the casing 99 in which heat energy is transferred from the gases to the air forced through tubes 104. The air is discharged from the ends of tubes 104 through conduits 107 into the combustion space. The gases leave the furnace through a flue.

In Fig. 9 of the drawings I have shown a modification of a heating element in accordance with my invention. This element is made of a spirally wound coil 108 with the adjacent parts of the coil sealed by welds 109. A plurality of heating elements of this kind may be connected together to form combinations as indicated in Figs. 7 and 8.

Instead of two pumps I may provide a single pump only in which case the condensate is forced through the preheater and from there directly through the boiler and the superheater. Such an arrangement is shown in Fig. 10 in which an elastic fluid turbine 110 has an inlet connected by means of a conduit 111 to a drum 112. Elastic fluid is supplied from the drum 112 to the turbine, and the exhaust of the turbine is condensed in a condenser 113 whence it is conducted through a conduit 114 and forced by means of a pump 115 through a preheater 116 corresponding to preheater 79 of Fig. 5. From the discharge conduit 117 of the preheater the fluid is conducted directly to a boiler comprising an inner nest of heating elements 118 with its discharge end connected to an outer nest of heating elements or a superheater 119 corresponding to superheater 74 in Fig. 5. The heater 119 has a discharge conduit 120 connected to the drum 112. The vapor discharged into the drum 112 is supplied to the turbine whereas the liquid drops to the bottom of the drum which thus acts as a separator. A lower portion of the drum 112 is connected by means of a conduit 121 to the suction conduit of the pump 115. The conduit 121 includes a valve means 122 operated in response to level changes in the drum. This is accomplished by means of a swimmer 123 connected to the stem of valve 122. The valve is closed when the liquid in the drum drops below a certain level and the valve 122 is opened as the liquid level in the drum rises.

The arrangement according to my invention permits the operation of an elastic fluid power plant with a comparatively very small amount of liquid. This is particularly advantageous in the case of a mercury vapor power plant because the cost of the mercury forms a considerable item in the total cost of such a plant. Practically the total amount of liquid is in steady circulation, and only a small amount is contained in the drum 50.

The relatively large heating surface of the elastic fluid generator and the forced circulation of fluid through the heating elements result in a rapid heating of the fluid and a considerable heat transfer per unit area of heating surface.

While I have described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In an elastic fluid generator, the combination of a plurality of heating elements, each element comprising an inner and an outer cylindrical sheet of corrugated metal welded together to define a plurality of parallel channels, an inlet conduit for conducting fluid to one end of each channel and an outlet conduit for discharging fluid from the other end of each channel, the elements being connected together and placed above each other to define a combustion space, means for forcing fluid to be evaporated through the elements, and a source of heat within the combustion space.

2. In an elastic fluid generator, the combination of a plurality of heating elements, each element comprising an inner and an outer cylindrical sheet of corrugated metal welded together to define a plurality of parallel channels, an inlet conduit for conducting fluid to one end of each channel and an outlet conduit for discharging fluid from the other end of each channel, the elements being connected together and placed above each other to define a combustion space, a plurality of outer heating elements concentrically spaced about the first named heating elements and connected thereto to define a superheater, the space between the inner and outer heating elements communicating with the combustion space, means for forcing fluid to be evaporated through the elements, and a source of heat in the combustion space.

LUCIAN A. SHELDON.